US011374222B2

(12) United States Patent
Oota

(10) Patent No.: US 11,374,222 B2
(45) Date of Patent: Jun. 28, 2022

(54) COMPOSITION FOR LITHIUM SECONDARY BATTERY ELECTRODES

(71) Applicant: SEKISUI CHEMICAL CO., LTD., Osaka (JP)

(72) Inventor: Ayako Oota, Shiga (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 0 days.

(21) Appl. No.: 15/558,436

(22) PCT Filed: Mar. 18, 2016

(86) PCT No.: PCT/JP2016/058717
§ 371 (c)(1),
(2) Date: Sep. 14, 2017

(87) PCT Pub. No.: WO2016/152783
PCT Pub. Date: Sep. 29, 2016

(65) Prior Publication Data
US 2018/0062178 A1 Mar. 1, 2018

(30) Foreign Application Priority Data
Mar. 20, 2015 (JP) .............................. JP2015-058423

(51) Int. Cl.
H01M 4/62 (2006.01)
H01M 4/13 (2010.01)
H01M 10/0525 (2010.01)
H01M 4/04 (2006.01)
H01M 10/052 (2010.01)

(52) U.S. Cl.
CPC ............. *H01M 4/622* (2013.01); *H01M 4/04* (2013.01); *H01M 4/13* (2013.01); *H01M 4/62* (2013.01); *H01M 10/052* (2013.01); *H01M 10/0525* (2013.01)

(58) Field of Classification Search
CPC .......... H01M 10/052; H01M 10/0525; H01M 4/04; H01M 4/13; H01M 4/62; H01M 4/622
See application file for complete search history.

(56) References Cited

U.S. PATENT DOCUMENTS

| 2004/0260020 | A1 | 12/2004 | Miyake et al. | |
|---|---|---|---|---|
| 2006/0121350 | A1 | 6/2006 | Kajiya et al. | |
| 2012/0321963 | A1 | 12/2012 | Fujioka et al. | |
| 2013/0175482 | A1* | 7/2013 | Schulz-Dobrick | H01M 4/131 252/506 |
| 2013/0197154 | A1* | 8/2013 | Yamaguchi | C04B 35/63416 524/543 |
| 2014/0004418 | A1* | 1/2014 | Kobayashi | H01M 4/622 429/211 |
| 2014/0045054 | A1 | 2/2014 | Komaba et al. | |
| 2015/0240018 | A1* | 8/2015 | Nagai | C08K 5/103 524/557 |
| 2016/0156024 | A1* | 6/2016 | Kinpara | H01M 4/58 252/511 |
| 2017/0018778 | A1* | 1/2017 | Nagai | H01M 4/133 |

FOREIGN PATENT DOCUMENTS

| CN | 1555590 | | 12/2004 | |
|---|---|---|---|---|
| CN | 100413125 | | 8/2008 | |
| JP | 2000038456 | A * | 2/2000 | ....... B32B 17/10688 |
| JP | 2001-089520 | | 4/2001 | |
| JP | 2006-169503 | | 6/2006 | |
| JP | 2007-265731 | | 10/2007 | |
| JP | 2007265731 | A * | 10/2007 | |
| JP | 2008-050412 | | 3/2008 | |
| JP | 2012-195289 | | 10/2012 | |
| JP | 2012195289 | A * | 10/2012 | |
| JP | 2013-048043 | | 3/2013 | |
| JP | 2013-178962 | | 9/2013 | |
| JP | 2013-179040 | | 9/2013 | |
| JP | 2014-135198 | | 7/2014 | |
| JP | 2014-224221 | | 12/2014 | |
| JP | 5708872 | | 4/2015 | |
| JP | 2015-88487 | | 5/2015 | |
| JP | 2015-115289 | | 6/2015 | |
| JP | 2015-141883 | | 8/2015 | |
| JP | 2015-179631 | | 10/2015 | |
| WO | 2011/087029 | | 7/2011 | |
| WO | 2012/133034 | | 10/2012 | |
| WO | WO-2014050795 | A1 * | 4/2014 | ............ C08F 261/12 |
| WO | 2015/146747 | | 10/2015 | |

OTHER PUBLICATIONS

JP2012-195289, Machine Translation, Otsuki, 2012 (Year: 2012).*
JP-2000038456-A, Machine Translation (Year: 2000).*
JP-2007265731-A, Machine Translation (Year: 2007).*
International Search Report dated Jun. 21, 2016 in International (PCT) Application No. PCT/JP2016/058717.
International Preliminary Report on Patentability dated Sep. 26, 2017 in International (PCT) Application No. PCT/JP2016/058717.
Extended European Search Report dated Oct. 18, 2018 in corresponding European Application No. 16768686.4.
International Search Report dated Jun. 13, 2017 in International (PCT) Application No. PCT/JP2017/013324.
Extended European Search Report dated Nov. 4, 2019 in European Application No. 17775432.2.
Pengfui, Shi (editor), "Chemical Power of Technology", Harbin Institute of Technology Press, Mar. 2006, p. 14, with concise English explanation.

(Continued)

*Primary Examiner* — Devina Pillay
(74) *Attorney, Agent, or Firm* — Wenderoth, Lind & Ponack, L.L.P.

(57) ABSTRACT

The present invention aims to provide a composition for a lithium secondary battery electrode which is excellent in dispersibility of an active material and adhesiveness to a current collector and is capable of producing a high-capacity lithium secondary battery. The present invention relates to a composition for a lithium secondary battery electrode including: an active material; a binder; and an organic solvent, the binder containing a polyvinyl acetal resin, the binder having a Na ion content of 100 ppm or less.

4 Claims, No Drawings

(56) References Cited

OTHER PUBLICATIONS

Chinese Automotive Technology & Research Centre, Beijing (editor), "Yearbook of Energy-Saving and New Energy Vehicles 2012", China Economic Publishing House, Dec. 2012, p. 31, with concise English explanation.

Tiejun, Yang (editor), "Indusuial Patent Analysis Report (vol. 23 Battery)", Intellectual Property Publishing House, May 2014, p. 138, with concise English explanation.

* cited by examiner

COMPOSITION FOR LITHIUM SECONDARY BATTERY ELECTRODES

TECHNICAL FIELD

The present invention relates to a composition for a lithium secondary battery electrode which is excellent in dispersibility of an active material and adhesiveness to a current collector and is capable of producing a high-capacity lithium secondary battery.

BACKGROUND ART

With the recent spread of mobile electronic devices such as mobile video cameras and mobile PCs, demand for secondary batteries as a portable power source is rapidly increasing. In addition, with respect to such secondary batteries, there is a great need for achieving downsizing, weight reduction, and enhanced energy density.

Conventionally, aqueous batteries such as lead batteries and nickel-cadmium batteries have been mainly used as secondary batteries which can be repeatedly charged and discharged. Though these aqueous solution-based batteries have excellent charge/discharge characteristics, they do not sufficiently satisfy the properties as a portable power source for a mobile electronic device in terms of the battery weight and energy density.

Lithium secondary batteries including negative electrodes made of lithium or a lithium alloy have been thus intensively studied and developed as secondary batteries. The lithium secondary batteries have excellent properties such as high energy density, less self-discharge, and light weight.

An electrode of a lithium secondary battery is commonly prepared as follows. An active material and a binder are kneaded together with a solvent so that the active material is dispersed, thereby preparing a slurry. The slurry is applied to a current collector by the doctor blade method or the like, and dried to form a thin film as an electrode.

At the present, a fluororesin typified by polyvinylidene fluoride (PVDF) is most widely used as a binder for an electrode of a lithium secondary battery.

In the case of using a fluororesin as a binder, though a flexible thin film can be prepared, binding between a current collector and an active material is poor. Due to this, the active material may partially or entirely be detached or fall off during a process of producing a battery. Moreover, upon charge and discharge of the battery, insertion and release of lithium ions are repeated in the active material. Due to this phenomenon, the active material may be detached or fall off from the current collector.

To solve such a problem, a binder other than PVDF has been tried to be used. In the case of using a conventional resin, however, decomposition or deterioration of the resin may occur upon application of a voltage to an electrode. When the resin is deteriorated, the charge/discharge capacity may be lowered and the electrode may be detached.

To overcome such a situation, Patent Literature 1 discloses a conductive coating liquid for a power storage device in which a polyvinyl alcohol having a degree of saponification of 75 mol % or higher is used as a binder resin.

However, the use of such a resin lowers the flexibility of the resulting electrode to cause cracking or peeling thereof from the current collector, leading to poor battery durability.

CITATION LIST

Patent Literature

Patent Literature 1: JP 2013-48043 A

SUMMARY OF INVENTION

Technical Problem

The present invention aims to provide a composition for a lithium secondary battery electrode which is excellent in dispersibility of an active material and adhesiveness to a current collector and is capable of producing a high-capacity lithium secondary battery.

Solution to Problem

The present invention relates to a composition for a lithium secondary battery electrode including: an active material; a binder; and an organic solvent, the binder containing a polyvinyl acetal resin, the binder having a Na ion content of 100 ppm or less.

The present invention is specifically described in the following.

As a result of intensive studies, the present inventors found out that the use of a polyvinyl acetal resin as a binder for forming a lithium secondary battery electrode can improve the dispersibility of an active material and adhesiveness to a current collector.

In the case of using a polyvinyl acetal resin, however, the battery capacity of the lithium secondary battery is disadvantageously lowered.

The present inventors found out that Na ions contained in a neutralizer used in acetalization causes such a reduction in the battery capacity, and that adjustment of the amount of Na ions in the binder to a predetermined amount or less ensures excellent dispersibility of an active material and adhesiveness to a current collector and also enables production of a high-capacity lithium secondary battery. Moreover, they also found out that, in the case of using a polyvinyl acetal resin as a binder for forming a lithium secondary battery electrode, the obtained composition is remarkably excellent in the viscosity stability over time to allow long-term storage thereof. The present invention was thus completed.

The composition for a lithium secondary battery electrode of the present invention contains an active material.

The composition for a lithium secondary battery electrode of the present invention may be used for a positive electrode or a negative electrode, or it may be used for both a positive electrode and a negative electrode. Accordingly, examples of a usable active material include positive electrode active materials and negative electrode active materials.

Examples of the positive electrode active materials include lithium-containing composite metal oxides such as lithium nickel oxides, lithium cobalt oxides, and lithium manganese oxides. Specific examples thereof include $LiNiO_2$, $LiCoO_2$, and $LiMn_2O_4$.

These may be used alone, or in combination of two or more thereof.

The negative electrode active material used may be a negative electrode active material conventionally used for a lithium secondary battery, and examples thereof include spherical natural graphite, natural graphite, artificial graphite, amorphous carbon, carbon black, and those obtained by adding a foreign element to these.

The composition for a lithium secondary battery electrode of the present invention preferably contains a conductivity imparting agent.

Examples of the conductivity imparting agent include graphite, acetylene black, carbon black, Ketjenblack, and vapor-grown carbon fiber. In particular, the conductivity imparting agent used for a positive electrode is preferably acetylene black or carbon black, while the conductivity imparting agent used for a negative electrode is preferably acetylene black or scaly graphite.

The composition for a lithium secondary battery electrode of the present invention contains a binder containing a polyvinyl acetal resin. In the present invention, the use of a polyvinyl acetal resin as a binder (a binding agent) causes an attractive interaction between a hydroxy group of the polyvinyl acetal resin and an oxygen atom of the positive electrode active material, leading to a structure in which the polyvinyl acetal resin surround the positive electrode active material. In addition, another hydroxy group in the same molecule has an attractive interaction with the conductivity imparting agent to keep the distance between the active material and the conductivity imparting agent within a predetermined range. Such a characteristic structure in which the distance between the active material and the conductivity imparting agent is kept within a specific range remarkably improves the dispersibility of the active material. In comparison with the case where a resin such as PVDF is used, the adhesiveness to the current collector can be improved. Moreover, the solvent solubility is excellent to advantageously widen the range of solvent selection.

The binder has a Na ion content of 100 ppm or less.

In a case where the binder containing Na ions is used for an electrode of a lithium secondary battery, the Li ion movement in an electrolyte is inhibited to lower the battery capacity. In the present invention, however, by determining the Na ion content of the binder, the Li ion movement is promoted to provide a high-capacity lithium secondary battery.

The lower limit of the Na ion content of the binder is preferably 0.0001 ppm, and the upper limit thereof is preferably 80 ppm.

The Na ion content can be determined by atomic absorption measurement.

The Na ions in the binder are preferably present in the form of —ONa. When a binder containing Na ions in such a form is used for a lithium secondary battery, the Na ion is less likely to have an influence and the movement of Li ions is not inhibited, leading to improvement in the discharge capacity.

When Na ions present in the binder are in the form of —ONa, the ratio of —ONa groups to hydroxy groups of the polyvinyl acetal resin (—ONa existence ratio) is preferably 0.01 to 35%. By setting the —ONa existence ratio within the above range, the movement of Li ions is promoted, thereby providing a high-capacity lithium secondary battery. The range is more preferably 0.01 to 10%.

The —ONa existence ratio can be determined as follows. The polyvinyl acetal resin is analyzed by FT-IR to determine the transmittance at the peak of —OH groups detected at around 3400 to 3500 cm$^{-1}$ (—OH group transmittance) and the transmittance at the peak of —ONa groups detected at around 1600 to 1700 cm$^{-1}$ (—ONa group transmittance). Based on the obtained values, the —ONa existence ratio is calculated using the following formula: —ONa existence ratio=(100-[—ONa group transmittance])/(100-[—OH group transmittance])×100.

The polyvinyl acetal resin commonly has a structural unit having a hydroxy group represented by the following formula (1) and a structural unit having an acetal group represented by the following formula (2).

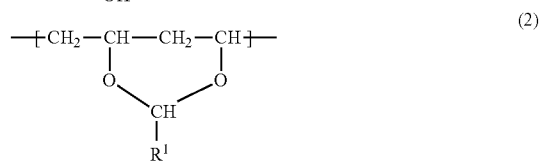

In the polyvinyl acetal resin, the lower limit of the amount of the structural unit having a hydroxy group represented by the formula (1) (hydroxy group content) is preferably 32 mol %, and the upper limit thereof is preferably 55 mol %. With the hydroxy group content of 32 mol % or higher, the resistance against an electrolyte can be improved to prevent elution of the resin into the electrolyte. With the hydroxy group content of 55 mol % or lower, the resin has better flexibility to ensure sufficient adhesion to a current collector.

The lower limit of the hydroxy group content is more preferably 35 mol %, and the upper limit thereof is more preferably 53 mol %.

The amount of the structural unit having an acetal group represented by the formula (2) (degree of acetalization) in the polyvinyl acetal resin is preferably 20 to 70 mol %. With the degree of acetalization of 20 mol % or higher, the solubility of the resin in a solvent is excellent, and such a resin is favorably used for the composition. With the degree of acetalization of 70 mol % or lower, the resistance against an electrolyte is enough to prevent elution of resin components into the electrolyte when the resulting electrode is immersed in the electrolyte. The degree of acetalization is more preferably 25 to 65 mol %.

The degree of acetalization as used herein refers to the proportion of the number of hydroxy groups acetalized with butyraldehyde to the number of hydroxy groups in the polyvinyl alcohol. Since an acetal group of the polyvinyl acetal resin is formed by acetalization of two hydroxy groups, the degree of acetalization (mol %) can be calculated by counting the unit of acetalized two hydroxy groups.

In the formula (2), R$^1$ represents a hydrogen atom or a C1-C20 alkyl, aryl, or allyl group, and preferably represents a C1 alkyl group or a C3 alkyl group.

The polyvinyl acetal resin in which R$^1$ is a C1 alkyl group or a C3 alkyl group is obtained by acetalization with acetaldehyde and butyraldehyde.

In the polyvinyl acetal resin, the ratio of a portion acetalized with acetaldehyde and a portion acetalized with butyraldehyde is preferably 0/100 to 50/50. With this structure, the polyvinyl acetal resin is soft to have favorable adhesion to a current collector. The ratio of the portion acetalized with acetaldehyde and the portion acetalized with butyraldehyde is more preferably 0/100 to 20/80.

The structural unit having an acetal group represented by the formula (2) can be obtained by acetalization with an aldehyde.

The lower limit of the carbon number of the aldehyde is preferably 1, and the upper limit thereof is preferably 11. With the carbon number within the above range, the resin has lower hydrophobicity to have better purification efficiency, leading to reduction of the Na ion content.

Specific examples of the aldehyde include acetaldehyde, butyraldehyde, benzaldehyde, propionaldehyde, and aldehydes having a vinyl group (vinyl aldehydes) such as acrolein.

The acetal group represented by the formula (2) is preferably at least one selected from the group consisting of a butyral group, a benzacetal group, an acetoacetal group, a propionacetal group and a vinyl acetal group.

The polyvinyl acetal resin preferably has a structural unit having an acetyl group represented by the following formula (3).

In the polyvinyl acetal resin, the lower limit of the amount of the structural unit having an acetyl group represented by the following formula (3) (acetyl group content) is preferably 1 mol %, and the upper limit thereof is preferably 20 mol %. With the acetyl group content of 1 mol % or higher, the resin has better flexibility to ensure sufficient adhesion to a current collector. With the acetyl group content of 20 mol % or lower, the resistance against an electrolyte is remarkably improved to prevent short circuit caused by elution of the resin into the electrolyte. The lower limit of the acetyl group content is more preferably 3 mol %, and the upper limit thereof is more preferably 10 mol %.

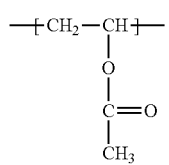

(3)

The polyvinyl acetal resin preferably contains a structural unit having an anionic group.

Containing the anionic group, the polyvinyl acetal resin easily adheres to the surface of the active material to enhance the dispersibility of the active material.

Examples of the anionic group include a sulfonyl group, a carboxy group, a sulfuric acid group, a phosphonic acid group, a nitrile group, and a phosphoric acid ester. Preferred among these is a sulfonyl group.

With the structural unit having a sulfonyl group, decomposition or deterioration of the resin can be suppressed even under a high voltage and the high capacity can be maintained. Containing a sulfonyl group that is an electron attractive group, the resin can prevent emission of electrons, and oxidative decomposition of the resin due to the emission of electrons can be suppressed. Among many electron attractive groups, the sulfonyl group having a tetrahedral structure is highly sterically hindered to inhibit adsorption of the resin to the conductivity imparting agent, leading to maintenance of the high capacity without lowering the resistance value.

The term "sulfonyl group" covers salts of the sulfonyl group.

The structural unit having a sulfonyl group is preferably a structural unit having a sulfonyl group represented by the following formula (4).

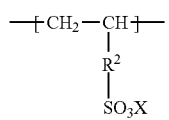

(4)

In the formula (4), $R^2$ represents a single bond or a C1-C10 saturated or unsaturated hydrocarbon, X represents hydrogen, sodium, or potassium.

When the structural unit having a sulfonyl group represented by the formula (4) has a structure in which the sulfonyl group is bonded to the main chain through a saturated or unsaturated hydrocarbon, the reactivity between a sulfonyl group-containing monomer and vinyl acetate is high, and therefore, the amount of sulfonyl modified groups in the molecule can be increased. Moreover, the sulfonyl group is less likely to be influenced by the main chain because of the bonding thereof through the saturated or unsaturated hydrocarbon. $R^2$ is preferably a C1-C10 saturated or unsaturated hydrocarbon.

$R^2$ is a C1-C10 saturated or unsaturated hydrocarbon. Examples of $R^2$ include linear or branched alkylene groups and arylene groups.

The alkylene group is preferably a linear group, and preferably a C1-C6 alkylene group. In particular, preferred are a methylene group, an ethylene group, and a propylene group.

X is preferably hydrogen or sodium.

In the polyvinyl acetal resin, the lower limit of the amount of the structural unit having a sulfonyl group represented by the formula (4) is preferably 0.1 mol %, and the upper limit thereof is preferably 8 mol %. With the amount of 0.1 mol % or higher, decomposition and deterioration of the resin due to oxidation of the resin under a high voltage can be prevented. With the amount of 8 mol % or lower, the hydrophilicity increases to allow the resin to contain much moisture, possibly promoting decomposition of the electrolyte. The lower limit of the amount is more preferably 0.1 mol %, and the upper limit thereof is more preferably 5 mol %.

The lower limit of the degree of polymerization of the polyvinyl acetal resin is preferably 250, and the upper limit thereof is preferably 4000. With the degree of polymerization of 250 or higher, such a resin is industrially easy to obtain. With the degree of polymerization of 4000 or lower, the solution viscosity becomes appropriate so that the active material is sufficiently dispersed. The lower limit of the degree of polymerization is more preferably 280, and the upper limit thereof is more preferably 1700.

The lower limit of the average molecular weight of the polyvinyl acetal resin is preferably $1.5 \times 10^4$, and the upper limit thereof is preferably $28.0 \times 10^4$. With the average molecular weight of $1.5 \times 10^4$ or more, such a resin is industrially easy to obtain. With the average molecular weight of $28.0 \times 10^4$ or less, the solution viscosity becomes appropriate so that the active material is sufficiently dispersed. The lower limit of the average molecular weight is more preferably $1.7 \times 10^4$, and the upper limit thereof is more preferably $11.0 \times 10^4$.

The average molecular weight refers to the number average molecular weight, and can be determined by the viscosity method.

The composition for a lithium secondary battery electrode of the present invention may have any polyvinyl acetal resin content. The lower limit thereof is preferably 0.2% by weight, and the upper limit thereof is preferably 5% by weight. With the polyvinyl acetal resin content of 0.2% by weight or more, the adhesion to a current collector is sufficient. With the polyvinyl acetal resin content of 5% by weight or less, the discharge capacity of the lithium secondary battery can be improved. The polyvinyl acetal resin content is more preferably 0.5 to 3% by weight.

The polyvinyl acetal resin is prepared by acetalizing a polyvinyl alcohol with an aldehyde.

In particular, an exemplary method of producing a polyvinyl acetal resin having the anionic group includes preparing a polyvinyl alcohol having a structural unit having the anionic group, and acetalizing the polyvinyl alcohol. Another exemplary method includes acetalizing a polyvinyl alcohol not having a structural unit having the anionic group, and adding a portion which is to be a structural unit having the anionic group.

An exemplary method of producing a polyvinyl alcohol having a structural unit having the anionic group includes, in the case of producing a polyvinyl alcohol having a structural unit having a sulfonyl group, for example, copolymerizing allylsulfonic acid with a vinyl ester such as vinyl acetate, and adding an acid or an alkali to a solution of the obtained copolymer in an alcohol for saponification.

An exemplary method of adding a portion corresponding to the structural unit having the anionic group includes reacting a polyvinyl alcohol not having a structural unit having the anionic group (hereafter, also simply referred to as a polyvinyl alcohol) with allylsulfonic acid, sodium allylsulfonate, or the like.

The polyvinyl alcohol is obtained, for example, by saponifying a copolymer of a vinyl ester and ethylene. Examples of the vinyl ester include vinyl formate, vinyl acetate, vinyl propionate, and vinyl pivalate. From the standpoint of the economic efficiency, preferred is vinyl acetate.

The polyvinyl alcohol may be copolymerized with an ethylenically unsaturated monomer within a range that the effect of the present invention is not impaired. The ethylenically unsaturated monomer is not limited, and examples thereof include acrylic acid, methacrylic acid, (anhydrous) phthalic acid, (anhydrous) maleic acid, (anhydrous) itaconic acid, acrylonitrile, methacrylonitrile, acrylamide, methacrylamide, trimethyl-(3-acrylamide-3-dimethylpropyl)-ammonium chloride, acrylamide-2-methylpropanesulfonic acid and its sodium salt, ethyl vinyl ether, butyl vinyl ether, N-vinyl pyrrolidone, vinyl chloride, vinyl bromide, vinyl fluoride, vinylidene chloride, vinylidene fluoride, tetrafluoroethylene, sodium vinylsulfonate, and sodium allylsulfonate. A terminal-modified polyvinyl alcohol obtained by copolymerizing a vinyl ester monomer such as vinyl acetate with ethylene in the presence of a thiol compound such as thiolacetic acid or mercaptopropionic acid, followed by saponification thereof, may also be used.

The polyvinyl alcohol may be prepared by saponifying a copolymer of the vinyl ester and an α-olefin. Moreover, the ethylenically unsaturated monomer may be further used in the copolymerization to provide a polyvinyl alcohol containing a component derived from an ethylenically unsaturated monomer. A terminal modified polyvinyl alcohol may also be used which is obtained by copolymerizing a vinyl ester monomer such as vinyl acetate with an α-olefin in the presence of a thiol compound such as thiolacetic acid or mercaptopropionic acid and saponifying the resulting product. The α-olefin is not limited, and examples thereof include methylene, ethylene, propylene, isopropylene, butylene, isobutylene, pentylene, hexylene, cyclohexylene, cyclohexyl ethylene, and cyclohexyl propylene.

In the present invention, the Na ion content of the binder may be adjusted to 100 ppm or less by, for example, adjusting the amount of Na ions contained in a polyvinyl alcohol used as a raw material to 100 ppm or lower; using, as a solvent for the acetalization reaction, distilled water or pure water purified using an ion exchange resin or a reverse-osmosis membrane, instead of a conventionally used soft water; not performing neutralization in which a neutralizer is added after the acetalization; or by setting the average particle size of the binder containing a polyvinyl acetal resin obtained after the acetalization to a small particle size of 200 μm or less.

In particular, the Na ion content of the binder is preferably adjusted by not performing neutralization in which a neutralizer is added after the acetalization.

In conventional acetalization reactions, if the neutralization is not performed, the acid used as a catalyst remains finally in the resin to easily cause decomposition of the polyvinyl acetal resin in the electrolyte. In contrast, in the case of employing the method of setting the average particle size of the binder containing a polyvinyl acetal resin obtained after the acetalization to a small particle size of 200 μm or less in combination, the acid used as a catalyst can be rinsed off only by washing, whereby the pH of the resin obtained is set to neutral without performing the neutralization.

In the present invention, the binder containing the polyvinyl acetal resin may have any form, and is preferably in the form of particles. With the binder in the form of particles, the solid concentration of the composition used as a paste can be changed as desired, and the water content of the resin can be reduced.

When the binder containing the polyvinyl acetal resin is in the form of particles, the lower limit of the average particle size of the binder containing the polyvinyl acetal resin is preferably 10 μm, and the upper limit thereof is preferably 200 μm. The lower limit is more preferably 25 μm, and the upper limit is more preferably 160 μm. With the average particle size within the above range, the acid used as a catalyst can be rinsed off only by washing, whereby the pH of the resin obtained is set to neutral without performing the neutralization. As a result, the Na ion content of the binder can be lowered.

The average particle size can be determined, for example, with a laser diffraction particle size analyzer (SALD-3100 from Shimadzu Corporation).

The composition for a lithium secondary battery electrode of the present invention may further contain, in addition to the polyvinyl acetal resin, a polyvinylidene fluoride resin.

The use of the polyvinylidene fluoride resin in combination further improves the resistance against an electrolyte to improve the discharge capacity.

In the case where the polyvinylidene fluoride resin is contained in the composition, the weight ratio between the polyvinyl acetal resin and the polyvinylidene fluoride resin is preferably 0.5:9.5 to 7:3.

With the weight ratio within such a range, the resistance against an electrolyte can be imparted, while the adhesion to a current collector which polyvinylidene fluoride remarkably lacks is maintained.

The weight ratio between the polyvinyl acetal resin and the polyvinylidene fluoride resin is more preferably 1:9 to 4:6.

The lower limit of the polyvinyl acetal resin content of the composition for a lithium secondary battery electrode of the present invention is preferably 0.01 parts by weight, and the upper limit thereof is preferably 20 parts by weight relative to 100 parts by weight of the active material. With the binder content of 0.01 parts by weight or more, the sufficient adhesion to a current collector can be ensured. With the binder content of 20 parts by weight or less, reduction in the discharge capacity of the lithium secondary battery can be prevented.

The entire binder content of the composition for a lithium secondary battery electrode of the present invention is not limited. The lower limit thereof is preferably 1% by weight, and the upper limit thereof is preferably 30% by weight. With the binder content of 1% by weight or more, the sufficient adhesion to a current collector can be ensured, while with the binder content of 30% by weight or less, reduction in the discharge capacity of the lithium secondary battery can be prevented.

The composition for a lithium secondary battery electrode of the present invention contains an organic solvent.

Any organic solvent may be used as long as it can dissolve the polyvinyl acetal resin therein. Examples thereof include cyclohexanone, methyl ethyl ketone, methyl isobutyl ketone, tetrahydrofuran, toluene, isopropyl alcohol, N-methylpyrrolidone, ethanol, and distilled water. Preferred among these is N-methylpyrrolidone.

These organic solvents may be used alone, or in combination of two or more thereof.

The organic solvent content of the composition for a lithium secondary battery electrode of the present invention is not limited. The lower limit thereof is preferably 20% by weight, and the upper limit thereof is preferably 50% by weight. With the organic solvent content of 20% by weight or more, the paste can have an appropriate viscosity to be easily applied. With the organic solvent content of 50% by weight or less, development of unevenness after drying the solvent can be prevented. The lower limit is more preferably 25% by weight, and the upper limit is more preferably 40% by weight.

The composition for a lithium secondary battery electrode of the present invention may optionally contain, in addition to the active material, polyvinyl acetal resin, and solvent described above, additives such as a flame retardant auxiliary, a thickener, a defoamer, a leveling agent, and an adhesion imparting agent.

The composition for a lithium secondary battery electrode of the present invention may be produced by any method, and an exemplary method includes mixing the active material, polyvinyl acetal resin, solvent, and additives, if needed, with any mixer such as a ball mill, a blender mill, or a triple roll mill.

The composition for a lithium secondary battery electrode of the present invention is formed into an electrode by application thereof to a conductive substrate, followed by drying.

A lithium secondary battery including the composition for a lithium secondary battery electrode of the present invention is also encompassed by the present invention.

Various means may be employed for application of the composition for a lithium secondary battery electrode of the present invention to a conductive substrate, such as an extrusion coater, a reverse roller, a doctor blade, or an applicator.

Advantageous Effects of Invention

The present invention can provide a composition for a lithium secondary battery electrode which is excellent in dispersibility of an active material and adhesiveness to a current collector and is capable of producing a high-capacity lithium secondary battery.

DESCRIPTION OF EMBODIMENTS

The present invention is more specifically described in the following with reference to, but not limited to, examples.

(Synthesis of Polyvinyl Acetal Resin A)

An amount of 350 parts by weight of a polyvinyl alcohol (number average molecular weight: $1.5 \times 10^4$, degree of saponification: 99 mol %) was added to 3000 parts by weight of pure water, and dissolved with stirring at 90° C. for about two hours. After cooling to 40° C., to the resulting solution was added 230 parts by weight of hydrochloric acid having a concentration of 35% by weight. The temperature of the solution was further lowered to 5° C., and the solution was blended with 155 parts by weight of n-butyraldehyde. The resulting solution was subjected to acetalization while the temperature was maintained at 5° C. for precipitation of a reaction product. Then, the solution was maintained to have a temperature of 30° C. for three hours for completion of the reaction. The solution was then subjected to neutralization by washing with water without using a neutralizer and subsequent drying to give a polyvinyl acetal resin in the form of white powder (average particle size: 168 μm).

The obtained polyvinyl acetal resin was dissolved in DMSO-$d_6$ (dimethyl sulfoxide) and the following parameters thereof were measured by $^{13}$C-NMR (nuclear magnetic resonance spectrum): the amount of a constitutional unit represented by the formula (1) [hydroxy group content]; the amount of a constitutional unit represented by the formula (2) [degree of acetalization]; and the amount of a constitutional unit represented by the formula (3) [acetyl group content]. The hydroxy group content was 37 mol %, the degree of acetalization (degree of butyralization) was 62 mol %, and the acetyl group content was 1 mol %.

The residual Na ion content of the obtained polyvinyl acetal resin was determined by atomic absorption measurement, and was 5 ppm.

The obtained polyvinyl acetal resin was analyzed by FT-IR (IRAffinity-1S from Shimadzu Corporation) to determine the transmittance at the peak of —OH groups detected at around 3400 to 3500 cm$^{-1}$ (—OH group transmittance) and the transmittance at the peak of —ONa groups detected at around 1600 to 1700 cm$^{-1}$ (—ONa group transmittance). The —ONa existence ratio determined based on the obtained values was 0.04%.

(Synthesis of Polyvinyl Acetal Resins B to F)

Polyvinyl acetal resins B to F were produced in the same manner as in the case of the polyvinyl acetal resin A, except that a polyvinyl alcohol having a number average molecular weight and a degree of saponification specified in Table 1 was used and that n-butyraldehyde in an amount specified in Table 1 was added.

Table 1 shows the hydroxy group content, degree of acetalization (degree of butyralization), acetyl group content, Na ion content, —ONa existence ratio, and average particle size of the obtained polyvinyl acetal resins B to F.

(Synthesis of Polyvinyl Acetal Resin G)

A polyvinyl acetal resin G was prepared in the same manner as in (Synthesis of polyvinyl acetal resin A), except that a polyvinyl alcohol (number average molecular weight: $7.0 \times 10^4$, degree of saponification: 99 mol %) was used, that 146 parts by weight of n-butyraldehyde was added, and that 3 parts by weight of sodium hydroxide was added as a neutralizer for neutralization and then washing with water was performed.

(Synthesis of Polyvinyl Acetal Resin H)

A polyvinyl acetal resin H was prepared in the same manner as in (Synthesis of polyvinyl acetal resin A), except that a polyvinyl alcohol (number average molecular weight: $9.0 \times 10^4$, degree of saponification: 99 mol %) was used, that 168 parts by weight of n-butyraldehyde was added, and that 3 parts by weight of sodium hydroxide was added for neutralization and then washing with water was performed.
(Synthesis of Polyvinyl Acetal Resins I to O)

Polyvinyl acetal resins I to O were prepared in the same manner as in the case of the polyvinyl acetal resin A, except that a polyvinyl alcohol having a number average molecular weight and a degree of saponification as specified in Table 1 was used and that n-butyraldehyde, benzaldehyde, acetaldehyde, propionaldehyde, and vinyl aldehyde each in an amount as specified in Table 1 were added.

Table 1 shows the hydroxy group content, degree of acetalization (degree of butyralization), acetyl group content, Na ion content, —ONa existence ratio, and average particle size of the obtained polyvinyl acetal resins I to O.

Example 3

A composition for a lithium secondary battery electrode was prepared in the same manner as in Example 1, except that 20 parts by weight of a resin solution containing the obtained polyvinyl acetal resin A (polyvinyl acetal resin: 10 parts by weight, NMP: 10 parts by weight) was used.

Examples 4 to 8

Compositions for a lithium secondary battery were prepared in the same manner as in Example 1, except that 20 parts by weight of a resin solution containing one of the

TABLE 1

| | Polyvinyl alcohol | | | | Polyvinyl acetal | | | | | |
|---|---|---|---|---|---|---|---|---|---|---|
| | Number | | Aldehyde | | Hydroxy | | Acetyl | | | —ONa |
| Resin | average molecular weight | Degree of saponification (mol %) | Amount (parts by weight) | Type | group content (mol %) | Degree of acetalization (mol %) | group content (mol %) | Average particle size (μm) | Na ion content (ppm) | existence ratio (%) |
| A | $1.5 \times 10^4$ | 99 | 155 | n-Butyraldehyde | 37 | 62 | 1 | 168 | 5 | 0.04 |
| B | $3.2 \times 10^4$ | 99 | 148 | n-Butyraldehyde | 44 | 55 | 1 | 161 | 5 | 0.03 |
| C | $7.0 \times 10^4$ | 99 | 143 | n-Butyraldehyde | 49 | 50 | 1 | 113 | 5 | 0.02 |
| D | $11.0 \times 10^4$ | 99 | 138 | n-Butyraldehyde | 54 | 45 | 1 | 149 | 5 | 0.01 |
| E | $25.0 \times 10^4$ | 99 | 163 | n-Butyraldehyde | 32 | 67 | 1 | 91 | 92 | 26 |
| F | $7.0 \times 10^4$ | 95 | 141 | n-Butyraldehyde | 47 | 48 | 5 | 109 | 11 | 10 |
| G | $7.0 \times 10^4$ | 99 | 146 | n-Butyraldehyde | 46 | 53 | 1 | 110 | 150 | 38 |
| H | $9.0 \times 10^4$ | 99 | 168 | n-Butyraldehyde | 24 | 75 | 1 | 85 | 180 | 39 |
| I | $9.0 \times 10^4$ | 80 | 129 | n-Butyraldehyde | 44 | 36 | 20 | 103 | 11 | 0.05 |
| J | $7.0 \times 10^4$ | 99 | 113 | n-Butyraldehyde | 79 | 20 | 1 | 89 | 3 | 0.01 |
| K | $3.2 \times 10^4$ | 99 | 148 | n-Butyraldehyde | 44 | 55 | 1 | 161 | 56 | 0.53 |
| L | $9.0 \times 10^4$ | 99 | 161 | Benzaldehyde | 41 | 58 | 1 | 120 | 8 | 0.42 |
| M | $11.0 \times 10^4$ | 99 | 123 | Acetaldehyde | 50 | 49 | 1 | 78 | 3 | 0.06 |
| N | $25.0 \times 10^4$ | 99 | 109 | Propionaldehyde | 44 | 55 | 1 | 99 | 6 | 0.38 |
| O | $7.0 \times 10^4$ | 99 | 111 | Vinyl aldehyde | 45 | 54 | 1 | 101 | 10 | 5.9 |

Example 1

(Preparation of Composition for Lithium Secondary Battery Electrode)

To 20 parts by weight of a resin solution containing the obtained polyvinyl acetal resin A (polyvinyl acetal resin: 2.5 parts by weight, NMP: 17.5 parts by weight) were added 50 parts by weight of lithium cobaltate (CELLSEED C-5H from Nippon Chemical Industrial Co., Ltd.) as an active material, 5 parts by weight of acetylene black (DENKA BLACK from Denki Kagaku Kogyo Kabushiki Kaisha) as a conductivity imparting agent, and 25 parts by weight of N-methylpyrrolidone, and mixed using a THINKY MIXER available from THINKY CORPORATION to prepare a composition for a lithium secondary battery electrode.

Example 2

A composition for a lithium secondary battery electrode was prepared in the same manner as in Example 1, except that 20 parts by weight of a resin solution containing the obtained polyvinyl acetal resin A (polyvinyl acetal resin: 0.005 parts by weight, NMP: 20 parts by weight) was used.

obtained polyvinyl acetal resins B to F (polyvinyl acetal resin: 2.5 parts by weight, NMP: 17.5 parts by weight) was used.

Examples 9 to 15

Compositions for a lithium secondary battery electrode were prepared in the same manner as in Example 1, except that 20 parts by weight of a resin solution containing one of the obtained polyvinyl acetal resins I to O (polyvinyl acetal resin: 2.5 parts by weight, NMP: 17.5 parts by weight) was used.

Comparative Example 1

A composition for a lithium secondary battery electrode was prepared in the same manner as in Example 1, except that 20 parts by weight of a resin solution containing PVDF (Kynar K720 from ARKEMA) (PVDF: 2.5 parts by weight, NMP: 17.5 parts by weight) was used.

Comparative Example 2

A composition for a lithium secondary battery electrode was prepared in the same manner as in Example 1, except that 20 parts by weight of a resin solution containing the obtained polyvinyl acetal resin G (polyvinyl acetal resin: 2.5 parts by weight, NMP: 17.5 parts by weight) was used.

Comparative Example 3

A composition for a lithium secondary battery electrode was prepared in the same manner as in Example 1, except that 20 parts by weight of a resin solution containing the obtained polyvinyl acetal resin H (polyvinyl acetal resin: 2.5 parts by weight, NMP: 17.5 parts by weight) was used.

<Evaluation>

The compositions for a lithium secondary battery electrode obtained in the examples and comparative examples were evaluated for the following parameters. Table 2 shows the results.

(1) Adhesiveness

Evaluation of the adhesiveness to aluminum foil was performed on the compositions for a lithium secondary battery electrode obtained in the examples and comparative examples.

The composition for an electrode was applied to aluminum foil (thickness: 20 μm) such that the thickness after drying was 20 μm, and dried to prepare a test sample in which a sheet-like electrode was formed on aluminum foil. A piece in a size of 1 cm in length and 2 cm in width was cut out from the sample. The sample piece was immobilized using an AUTOGRAPH ("AGS-J" from Shimadzu Corporation) and the electrode sheet was pulled up for measurement of the peeling force (N) needed for completely peeling the electrode sheet from the aluminum foil. The adhesiveness of each composition was evaluated based on the following criteria.

○ (Good): Peeling force of higher than 8.0 N.
Δ (Average): Peeling force of 5.0 to 8.0 N.
x (Poor): Peeling force of lower than 5.0 N.

(2) Dispersibility

Using the test sample in "(1) Adhesiveness", the surface roughness Ra was measured in conformity with JIS B 0601 (1994). The surface roughness of the electrode was evaluated based on the following criteria. Commonly, when the dispersibility of the active material is higher, the surface roughness is said to be smaller.

○○ (Excellent): Ra of less than 2 μm.
○ (Good): Ra of 2 μm or more but less than 5 μm.
Δ (Average): Ra of 5 μm or more but less than 8 μm.
x (Poor): Ra of 8 μm or more.

(3) Solvent Solubility (Production of Electrode Sheet)

Onto a polyethylene terephthalate (PET) film preliminarily subjected to release treatment was applied each of the compositions for a lithium secondary battery electrode obtained in the examples and comparative examples such that the thickness after drying was 20 μm, and dried to give an electrode sheet.

A 2-cm-square piece was cut out from the electrode sheet to prepare an electrode sheet sample.

(Evaluation of Elution)

The obtained sample was accurately weighed, and the weight of the resin contained in the sample was calculated based on the weight ratio of the components contained in the sheet. Then, the sample was placed in a mesh bag, and the total weight of the mesh bag and the sample was accurately measured.

The mesh bag containing the sample was immersed in diethyl carbonate that is an electrolyte and left to stand at room temperature overnight. After the standing, the mesh bag was taken out and dried under the conditions of 150° C. and eight hours, thereby completely vaporizing the solvent.

The mesh bag was taken out from the dryer, left for standing at room temperature for one hour, and weighed. The elution amount of the resin was calculated based on the weight change before and after the test, and the elution rate of the resin was calculated based on the ratio between the elution amount and the preliminarily calculated weight of the resin. The higher elution rate indicates that the resin is more likely to be eluted in the electrolyte.

(4) Viscosity Stability Over Time

The paste viscosity of each of the compositions for a lithium secondary battery electrode obtained in the examples and comparative examples was measured using a Brookfield viscometer. The viscosity was measured on the day the paste was produced and a week after that day. The change rate of the viscosity over time (([Viscosity one week after the production−viscosity on the production day]×100/viscosity on the production day) was evaluated based on the following criteria. Commonly, when the viscosity stability is higher, the change rate of the viscosity over time is said to be smaller.

○○ (Excellent): The change rate of viscosity over time of 30% or lower
○ (Good): The change rate of viscosity over time of higher than 30% but not higher than 50%
Δ (Average): The change rate of viscosity over time of higher than 50% but lower than 100%
x (Poor): The change rate of viscosity over time of 100% or higher (5) Evaluation of Battery Performance (a) Production of Coin Battery Each of the compositions for a lithium secondary battery positive electrode obtained in the examples and comparative examples was applied to aluminum film and dried to form a layer with a thickness of 0.2 mm. A φ 12-mm piece was punched out from the resulting layer to prepare a positive electrode layer.

Separately, a φ 12-mm piece was punched out from a negative electrode sheet (A100 with single-sided coating) available from Hohsen Corp. as a composition for a lithium secondary battery negative electrode to prepare a negative electrode layer.

The electrolyte used was a mixed solution with ethylene carbonate containing $LiPF_6$ (1M). The positive electrode layer was impregnated with the electrolyte and then placed on a positive electrode current collector. A porous PP film (separator) with a thickness of 25 mm impregnated with the electrolyte was further placed thereon.

A lithium metal plate serving as a reference electrode was further placed thereon, and a negative electrode current collector covered with an insulating packing was placed on the top. The resulting laminate was pressurized using a caulking machine to provide a sealed coin battery.

(b) Evaluation of Discharge Capacity and Charge/Discharge Cycle

Evaluation of the discharge capacity and charge/discharge cycle was performed on the obtained coin batteries using a charge/discharge tester available from Hohsen Corp.

The evaluation of the discharge capacity and charge/discharge cycle was performed under the conditions of the voltage range of 3.0 to 4.5 V and the evaluation temperature of 20° C.

TABLE 2

| | Composition for lithium secondary battery electrode | | | | Evaluation | | | | | | | | |
|---|---|---|---|---|---|---|---|---|---|---|---|---|---|
| | | Binder | | Amount relative to 100 parts by weight of active material (parts by weight) | | | Composition | | | | | Battery | |
| | Active material (parts by weight) | Resin | Amount (parts by weight) | | Peeling force (N) | Rate | Surface roughness Ra (μm) | Rate | Elution rate (%) | Change rate of viscosity over time (%) | Rate | Discharge capacity (mAh/g) | Charge/discharge cycle (%) |
| Example 1 | 50 | A | 2.5 | 5 | 9.3 | ○ | 1.43 | ○○ | 1.9 | 34 | ○ | 130 | 95 |
| Example 2 | 50 | A | 0.005 | 0.01 | 5.1 | Δ | 4.90 | ○ | 1.9 | 62 | Δ | 136 | 97 |
| Example 3 | 50 | A | 10 | 20 | 26.1 | ○ | 1.11 | ○○ | 1.9 | 18 | ○○ | 113 | 91 |
| Example 4 | 50 | B | 2.5 | 5 | 8.5 | ○ | 1.58 | ○○ | 1.6 | 28 | ○○ | 132 | 93 |
| Example 5 | 50 | C | 2.5 | 5 | 7.9 | Δ | 1.64 | ○○ | 1.1 | 30 | ○○ | 134 | 98 |
| Example 6 | 50 | D | 2.5 | 5 | 6.8 | Δ | 1.99 | ○○ | 0.4 | 21 | ○○ | 129 | 96 |
| Example 7 | 50 | E | 2.5 | 5 | 5.4 | Δ | 2.72 | ○ | 2.3 | 42 | ○ | 125 | 94 |
| Example 8 | 50 | F | 2.5 | 5 | 7.3 | Δ | 1.83 | ○○ | 0.7 | 48 | ○ | 120 | 94 |
| Example 9 | 50 | I | 2.5 | 5 | 6.8 | Δ | 3.86 | ○ | 2.1 | 42 | ○ | 118 | 91 |
| Example 10 | 50 | J | 2.5 | 5 | 9.1 | ○ | 2.61 | ○ | 0.8 | 75 | Δ | 145 | 92 |
| Example 11 | 50 | K | 2.5 | 5 | 6.6 | Δ | 3.42 | ○ | 1.3 | 37 | ○ | 110 | 90 |
| Example 12 | 50 | L | 2.5 | 5 | 5.4 | Δ | 4.33 | ○ | 1.5 | 25 | ○○ | 138 | 99 |
| Example 13 | 50 | M | 2.5 | 5 | 8.3 | ○ | 4.73 | ○ | 0.9 | 51 | Δ | 109 | 93 |
| Example 14 | 50 | N | 2.5 | 5 | 10.2 | ○ | 4.96 | ○ | 1.4 | 40 | ○ | 121 | 95 |
| Example 15 | 50 | O | 2.5 | 5 | 5.3 | Δ | 3.12 | ○ | 1.8 | 33 | ○ | 140 | 98 |
| Comparative Example 1 | 50 | PVDF | 2.5 | 5 | 0.21 | x | 8.96 | x | 0.1 | 107 | x | 122 | 85 |
| Comparative Example 2 | 50 | G | 2.5 | 5 | 8.0 | Δ | 1.70 | ○○ | 1.4 | 45 | ○ | 89 | 69 |
| Comparative Example 3 | 50 | H | 2.5 | 5 | 7.1 | Δ | 2.49 | ○ | 2.9 | 48 | ○ | 76 | 58 |

INDUSTRIAL APPLICABILITY

The present invention provides a composition for a lithium secondary battery electrode which is excellent in dispersibility of an active material and adhesiveness to a current collector and is capable of producing a high-capacity lithium secondary battery.

The invention claimed is:

1. A composition for a lithium secondary battery electrode comprising:
an active material;
a binder in the form of particles having an average particle size from 113 μm to 168 μm; and
an organic solvent,
wherein the binder contains a polyvinyl acetal resin, and has a Na ion content of 100 ppm or less,
the Na ion in the binder is present in the form of —ONa, wherein a ratio of —ONa groups to hydroxy groups of the polyvinyl acetal resin is 0.01 to 35%,
the composition contains the polyvinyl acetal resin in an amount of 0.01 to 20 parts by weight relative to 100 parts by weight of the active material,
the polyvinyl acetal resin has a structural unit having a sulfonyl group represented by the following formula (4) in an amount from 0.1 mol % to 8 mol %,

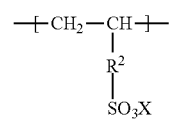

(4)

wherein in the formula (4), $R^2$ represents a single bond or a C1-C10 saturated or unsaturated hydrocarbon, and X represents hydrogen, sodium, or potassium, and
the polyvinyl acetal resin has at least one group selected from the group consisting of a butyral group, a benzacetal group, an acetoacetal group, a propionacetal group, and a vinyl acetal group.

2. The composition for a lithium secondary battery electrode according to claim 1,
wherein the polyvinyl acetal resin has a degree of acetalization of 20 to 70 mol %.

3. The composition for a lithium secondary battery electrode according to claim 1,
wherein the polyvinyl acetal resin has an average molecular weight of $1.5 \times 10^4$ to $28.0 \times 10^4$.

4. A lithium secondary battery comprising the composition for a lithium secondary battery electrode according to claim 1.

* * * * *